L. PEASE & A. W. SCHOENHEIT.
ANIMAL TRAP.
APPLICATION FILED JAN. 17, 1917.
1,240,248.
Patented Sept. 18, 1917.
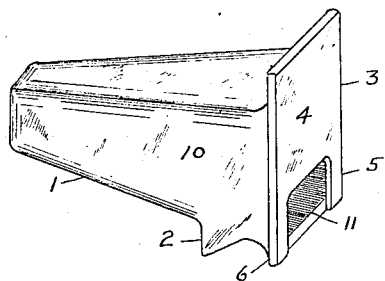
FIG. 1
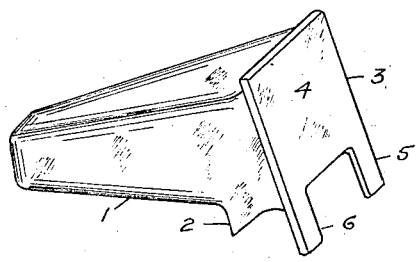
FIG. 2
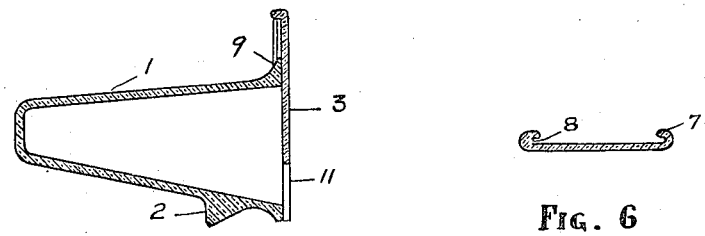
FIG. 3
FIG. 6
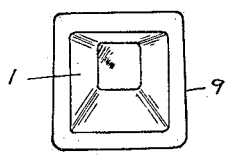
FIG. 4
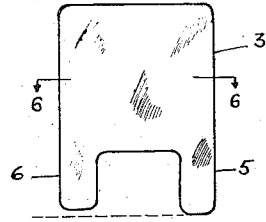
FIG. 5
WITNESSES
Walter S. Klemansk
J. T. Byers
INVENTORS·
Louis Pease and
August W. Schoenheit.
by William B. Wharton
their attorney

UNITED STATES PATENT OFFICE.

LOUIS PEASE AND AUGUST W. SCHOENHEIT, OF PITTSBURGH, PENNSYLVANIA.

ANIMAL-TRAP.

1,240,248.   Specification of Letters Patent.   Patented Sept. 18, 1917.

Application filed January 17, 1917. Serial No. 142,813.

*To all whom it may concern:*

Be it known that we, LOUIS PEASE and AUGUST W. SCHOENHEIT, both citizens of the United States, and residents of Pittsburgh, Allegheny county, Pennsylvania, have invented a new and useful Improvement in Animal-Traps, of which the following is a specification.

This invention relates to an animal trap, and particularly to a trap adapted to the capture of mice, rats, and other small rodents.

One object of the invention is to provide a trap in which the weight of the animal serves to spring the trap by causing a movement of the body thereof and which movement serves to close the opening of the trap and prevents escape of the animal. A further object of the invention is to provide an animal trap which is made of few parts, is simple and inexpensive to manufacture, and which may be made of any suitable material, being particularly so designed that it may be pressed from, and entirely formed of glass, or similar moisture-proof material, so as to furnish a trap which can be readily cleansed, which will not retain odors, is strictly sanitary and is not subject to rust. A still further object of the invention is to provide a trap which may be readily set and which is quick and positive in its operation.

In the accompanying drawings, Figure 1 is a perspective view of the trap as set; Fig. 2 is a similar view of the trap sprung; Fig. 3 is a vertical cross section through the trap; Fig. 4 is a front elevation of the trap with the gate removed; Fig. 5 is a front elevation of the gate of the trap; and Fig. 6 is a cross section through the gate on the line 6—6 Fig. 5.

The body 1 of the trap is a receptacle open at one end, and as shown, tapering from the open or forward end toward the rearward or closed end. This receptacle or body 1 is so proportioned that it may be balanced upon a foot 2 and a gate 3 on the forward end to elevate the rearward end of the body in the position illustrated in Fig. 1 of the drawings. As illustrated, this balancing is effected by the tapering of the body 1 so that the greater weight of the body lies near the forward or open end thereof and permits the foot 2 to be located adjacent the forward end, and yet maintain an approximate equality between the weight of the portion of the body lying rearwardly of the foot and that of the portion of the body lying forwardly of the foot. The trap will thus readily stand in set or forwardly balanced position, and will yet be sensitive and easily sprung owing to the relatively long arm lying rearwardly of the fulcrum formed by the foot 2. This proportioning is subject however to considerable modification, since a substantially analogous effect may be secured by reducing the taper of the body 1 and by thickening the material of the walls adjacent its forward extremity in order to provide an increased weight of material at this point. In general, any proportioning of the shape of the body and thickness of the material may be used which will secure the desired result, namely, a tilting body receptacle which may be readily caused to stand in set position and which will at the same time respond quickly and positively to slight forces tending to overbalance the same and cause it to fall rearwardly to spring the trap.

The gate 3, which may also be readily formed of pressed glass, comprises a solid closure portion 4 and legs 5 and 6, the portion 4 being of sufficient size to completely close the opening in the body 1 when the trap is sprung. The gate 3 on its rearward face has curved extensions 7 along each edge to form channels 8 in which are slidable lips or sills 9 surrounding the opening of the body member 1. One of the legs of the gate 3 is preferably formed slightly shorter in length than the other, the leg 6 being shown of shorter length than the leg 5, so that when the gate is placed in position in the body and the trap set as in Fig. 1 of the drawings, the weight of the body will cause a slight wedging of the sills 9 in the channels 8. This wedging action is of assistance in maintaining the trap in set position, without unduly retarding the springing of the trap, and by this means the preponderance of weight necessary forward of the center of gravity of the trap when set is greatly lessened or avoided, as in the form shown where the weight of the member forward of the foot 2 is substantially equal to the weight of the member rearwardly thereof. The gate 3 and the vertical sills 9 of the body 1 are preferably formed with a slight upward taper to allow this wedging action to be more readily obtained and to facilitate the upward movement of the forward end of the body 1 in the gate 3, in order to bring the trap quickly into the sprung or closed position illustrated in Fig. 2 of the drawings. The sides 10 of the receptacle 1 are flared outwardly adjacent the opening in the forward extremity thereof, this outward flaring forming the sills 9 and also giving added weight to this portion of the receptacle without thickening of the walls by additional material.

In use of the trap, the bait is placed in the rearward portion thereof, the leg 5 of the gate is placed squarely on the floor and the body 1 tilted forwardly in the gate until it remains in equilibrium therein. In this position the upper portion of the gate extends considerably beyond the body of the trap, and the opening 11 between the legs 5 and 6 of the gate provides ingress to the body of the trap. When an animal then enters the trap through the opening 11, it is necessary for it to proceed merely a very short distance rearwardly therein in order to overbalance the body 1, and cause it to rotate on the foot 2; so that the rearward end of the trap falls until it rests in position on the floor, and the forward end of the trap rests in position on the floor, and the forward end of the trap slides upwardly in the gate 3 so that the portion 4 thereof completely closes the opening in the body 1, this position of the trap being that illustrated in Fig. 2 of the drawings. In springing the trap the leg 5 of the gate 3 remains in position on the surface upon which the trap is laid, while the gate as a whole sinks rearwardly with the receptacle, or body member 1. In this position also there is a slight wedging between the body and gate which assists in maintaining the trap in closed position. Because of the small amount of room in the interior of the receptacle forwardly of the foot 2, it is, moreover, impossible for an animal in the trap to take such a position therein as to cause it to tilt forwardly to open the entrance between the legs of the gate.

When the trap is used for the capture of small animals they can be readily drowned by merely sliding the gate so as to leave a small opening in the trap and filling it with water. When the trap is made of glass, as is preferable for household use, failure to pay attention to it after setting, and consequent death of the animal, will not cause serious inconvenience, since the trap is practically odorproof when in sprung or closed position and may be scalded after removal of the animal to completely cleanse and render it odorless.

It is to be noted that the interior of the body member or receptacle 1 presents smooth, plane surfaces throughout, so that it may be readily pressed from glass, thus making the manufacture of the trap less expensive than if a blowing operation were necessary. The gate 3 can also be similarly pressed, and the body members of a number of traps may be nested for convenience in shipping. There is a total absence of springs such as may injure the fingers while setting the trap, and also a total absence of exposed metal or wooden parts of any nature, so that the trap is not subject to rusting or other deterioration due to moisture. The trap as a whole is particularly designed not only to be efficient in use, but also to provide an article of great commercial possibilities, when put out in the size and material to be used for the catching of small rodents.

It is obvious, however, that the trap may be readily formed of such size and material as will adapt it for use in the capture of animals of practically any size or nature. As above stated moreover, the device is susceptible of a considerable number of obvious modifications in shape and in proportioning without departing from the spirit of the invention as defined by the appended claims.

What we claim is:—

1. An animal trap comprising a substantially stationary gate having an opening in the lower portion thereof, a receptacle or body member having an opening in its forward extremity and means adjacent said opening whereby it has a sliding and wedging engagement with said gate, and a foot upon which said body member tilts.

2. An animal trap comprising a substantially stationary gate having an opening in the lower portion thereof, a receptacle or body member having an opening in its forward extremity and means adjacent said opening whereby it has a sliding and wedging engagement with said gate, and a foot upon which said body member tilts, said foot being located forwardly of the transverse central line of said body member and said body member being so proportioned that the weight of the member forwardly of the foot is substantially equal to the weight of the member rearwardly thereof.

3. An animal trap comprising a tilting receptacle or body member having an entrance opening therein and arranged to be moved by the entrance of an animal thereinto, and a gate having a sliding engagement with said body member and arranged to permit entrance of an animal into said body member when tilted forwardly therein, said gate having a pair of legs of different lengths upon the longer of which it rests to normally maintain said body member in forwardly tilted position due to the wedging engagement between said body member and gate caused by the unbalanced position of the latter.

4. An animal trap comprising a gate having a pair of legs of different lengths and arranged to rest in unbalanced position upon the longer thereof, and a tilting receptacle or body member slidable in said gate and arranged to be maintained in forwardly tilted position due to the wedging action caused by the unbalanced position of the gate and the weight of said body member.

5. An animal trap comprising an integral receptacle or body member arranged to tilt as a whole and having an entrance open in one position of the receptacle, and means for closing the entrance opening upon movement of the receptacle into its other position by the entrance of an animal thereinto, said trap being so proportioned and arranged that the receptacle will remain in equilibrium in closed position of the trap irrespective of the movements of the animal therein.

6. An animal trap comprising an integral receptacle or body member having an entrance opening therein and arranged to be tilted as a whole by the entrance of an animal thereinto, and a gate arranged to permit entrance of an animal into said body member when the latter is tilted forwardly but to close said entrance opening in said body member when tilted rearwardly, said trap being so proportioned and arranged that the receptacle will remain in equilibrium in its rearwardly tilted position irrespective of the movements of the animal therein.

7. An animal trap comprising a substantially stationary gate having an opening in the lower portion thereof and arranged to rest upon a surface in unbalanced position, a receptacle or body member having an opening in its forward extremity, means upon which said body member tilts, and interengaging means on said member and gate whereby the gate by its unbalanced position is enabled to exert a wedging action on said body member for maintaining the latter in equilibrium in tilted position.

8. An animal trap comprising a receptacle or body member having an opening therein, a foot upon which said body member tilts, the weight of said body member being distributed substantially equally forwardly and rearwardly of said foot, a gate arranged to provide an opening into said body member in one position thereof and to close the same in the other position of the body member, and interengaging means on said gate and body member whereby said gate serves to resist movement of said body member from either position.

9. An animal trap comprising a substantially stationary gate having an opening in the lower portion thereof, a receptacle or body member having an opening in its forward extremity, means adjacent said opening whereby it has a sliding and wedging engagement with said gate, and means upon which said body member tilts.

In testimony whereof, we have hereunto set our hands.

LOUIS PEASE.
AUGUST W. SCHOENHEIT.

In the presence of—
WALTER S. KLEMANSK,
SUE B. FRITZ.

Copies of this patent may be obtained for five cents each, by addressing the "Commissioner of Patents, Washington, D. C."